though a calibrated

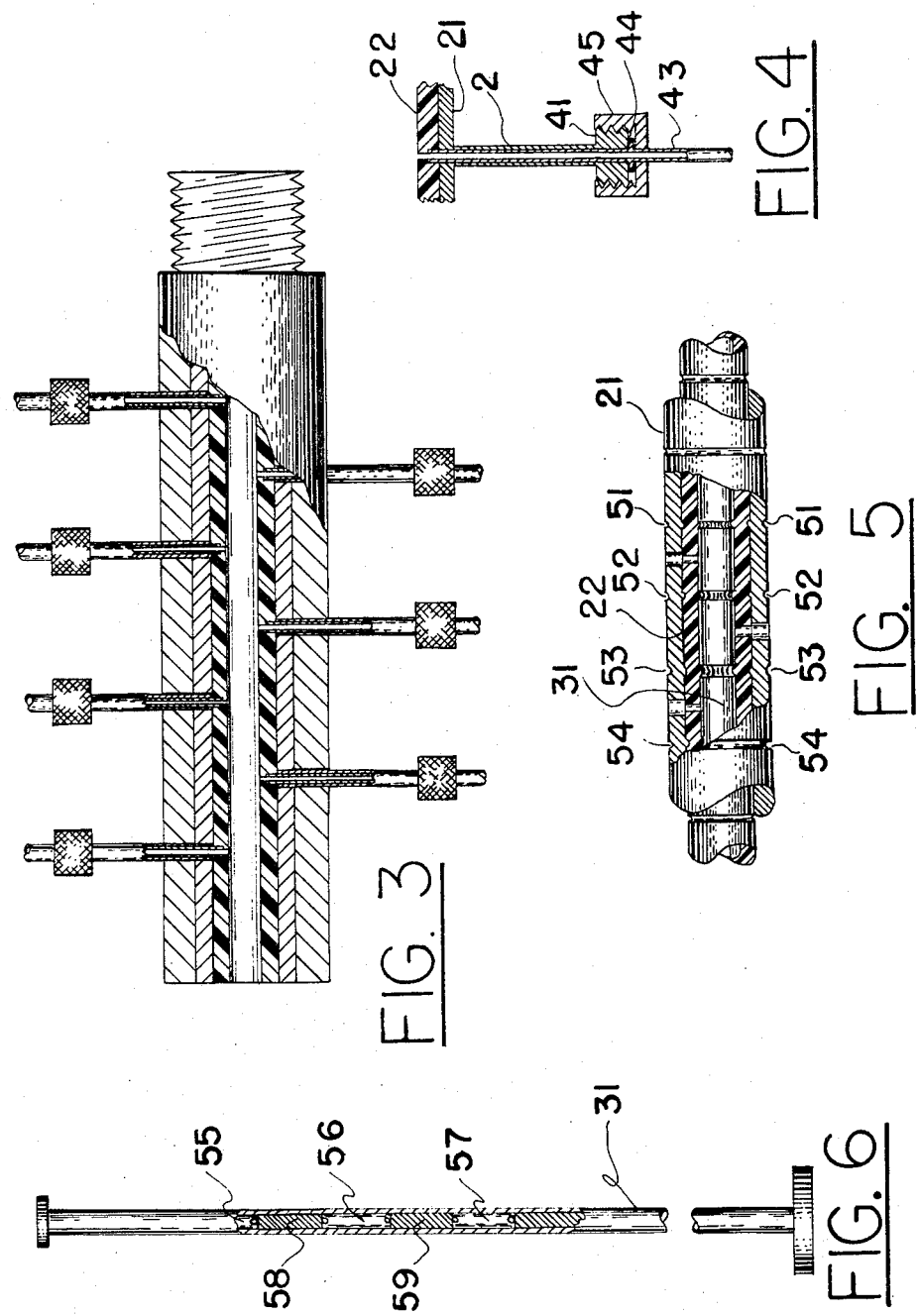

United States Patent Office 3,385,113
Patented May 28, 1968

3,385,113
MULTIPORT VALVES
Rano Joseph Harris, Baton Rouge, La., assignor to Precision Sampling Corporation, a corporation of Louisiana
Filed Nov. 3, 1965, Ser. No. 506,230
7 Claims. (Cl. 73—422)

ABSTRACT OF THE DISCLOSURE

A valve of the type used for obtaining samples for gas chromatographic analysis. An outer tubular member surrounds a composite inner tubular member comprising an outer shell and inner packing. These elements are provided with suitable aligned inlet and outlet ports. A reciprocable plunger is provided with a plurality of relatively short channels lying along the axis of the plunger, both ends of each channel includes a lateral opening for alignment with selected adjacent pairs of ports. Movement of the plunger within the valve changes the paths of flow.

Figure 1:
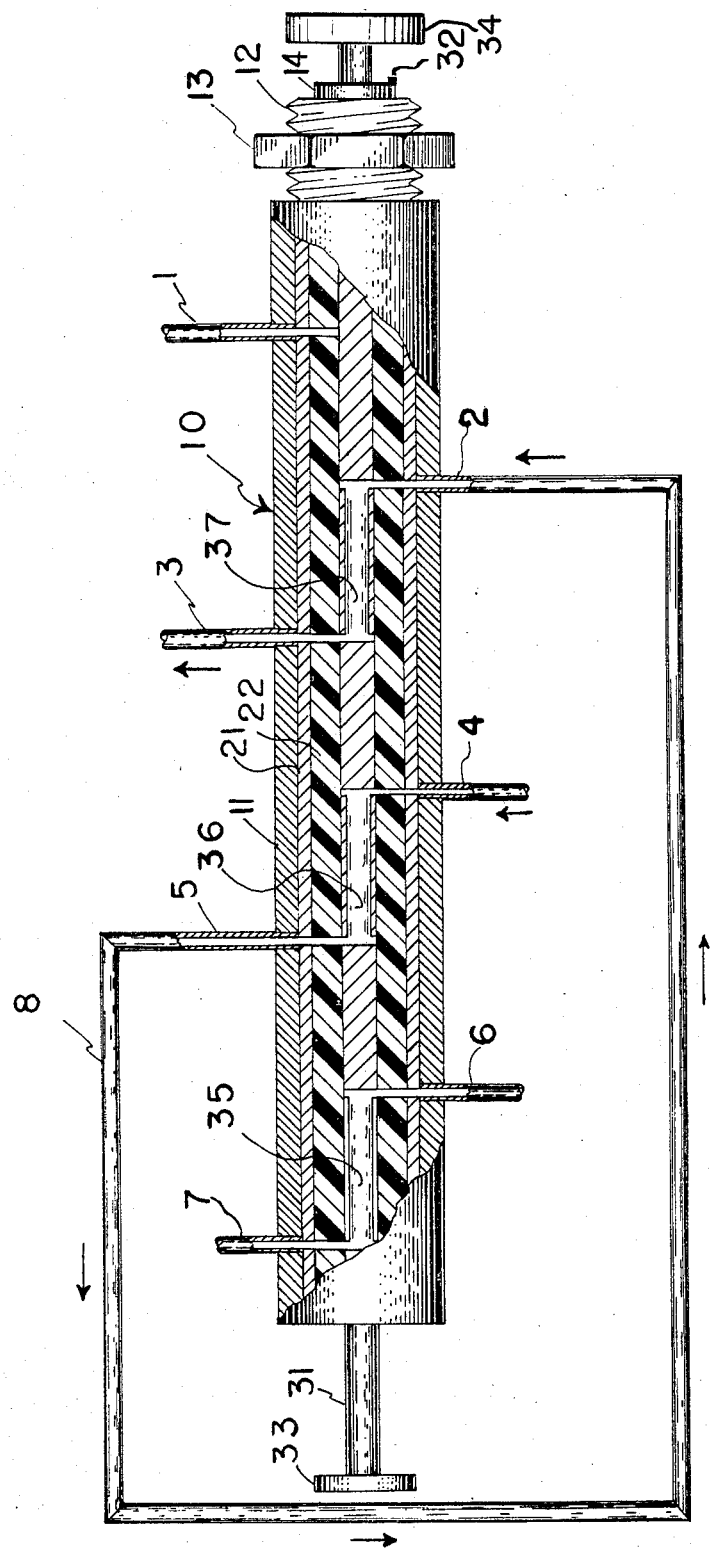

This invention relates to improvements in valves of the type used for sampling fluids. In particular, it relates to new and improved valves for trapping accurately measured portions of fluid, i.e. fluid samples or specimens, for delivery to analytical devices.

It is conventional to employ valves wherein accurately measured reproducible volumes of fluid from a supply source are delivered to and trapped within the chamber of fluid sampling valves and then injected into an analytical device, e.g. a gas chromatograph. The trapping of the fluid and the dispensing of same to the analytical instrument are performed in two steps which constitute a cycle of operation.

In one such prior art valve a reciprocable plunger extends through the central axis thereof, and the central axis is coextensive with a generally elongated opening which forms two principal chambers. It is these principal chambers, respectively, which perform the functions of trapping and dispensing the fluid. These functions occur within an individual chamber by action of the reciprocable plunger. The outer circumference of one portion of the reciprocable plunger is cut away, and the "cut-away" portion is movable back-and-forth between the two principal chambers, one of which is a chamber for picking up a fluid specimen and the other a chamber for dispensing the specimen into the chromatograph. In this device two plunger movements are required for completing a cycle of operation—viz. a withdrawal movement for filling the device with fluid, and a forward movement of the plunger for discharging fluid into the analytical device.

In the "closed position" of the valve the cut-away portion of the plunger is within the "pick-up" chamber and therein fluid flows into and fills the said cut-away portion. To "open" the valve, the plunger is moved linearly to project the cut-away portion of the plunger through a close fitting packing which not only divides the two chambers, but also wipes away any excess of fluid and assures a measured and reproducible quantity of fluid for delivery into the dispensing chamber. In the latter, or open position, a carrier gas sweeps the fluid from the cut-away portion of the plunger and carries the fluid specimen from the dispensing chamber into the analytical device.

Other types of valves, i.e. multiport valves, utilizing the same general principle of operation are also employed. In this type of valve each reciprocation of the plunger, i.e. a backward and forward movement constitutes a complete cycle of operation. In a given plunger position the required fluid specimen is passed through a calibrated loop. Simultaneously, carrier gas flows through an "empty" conduit to the analytical device. To discharge the contents of the calibrated loop into the chromatograph the plunger is moved linearly to the reverse position to disconnect the calibrated loop from the supply source and simultaneously to connect the calibrated loop with a source of carrier gas which sweeps the specimen into the chromatograph. Each reciprocal motion of the plunger fills the calibrated loop of the valve and also discharges the contents of a previously filled loop to the analytical instrument.

These prior art valves are of modular construction, i.e. are composed of a plurality of generally oval or round open centered sections. Each side or face of a section, around each opening, is substantially uniformly partially cut away to form annuli about the center opening. The individual sections fit together so that the open centers form a path for the plunger. The cut away portions provide spaces for packings. Thus, within the openings wherein pairs of sections fit together tubular packings are provided.

Narrow openings perpendicular to the said central axis are also provided within the oval sections. These openings communicate with the opening through the central axis, and are spaced apart, and alternately arranged at 180 degrees one to the others, to form, with the opening through the central axis, a series of channels through the valve. Movement of the plunger, which also has undercuts or cut-away portions along its length, opens one conduit or set of conduits and simultaneously closes another so that each plunger movement fills a conduit with the fluid specimen, and simultaneously ejects fluid from a previously filled conduit via passage of carrier gas therethrough.

While such prior art valves have been employed with success, they nonetheless possess several shortcomings. Their primary deficiency resides in their complex construction. Moreover, at relatively high temperature and pressure the valve packings develop leaks. The packings also swell and make movement of the plunger difficult. These problems become particularly manifest after the packings have been used. Thus, as the packings age the efficiency and use of the valve is seriously impaired, and the packings must be replaced. Replacement of packings is a considerable undertaking due primarily to the complex construction of such valves. To change the packing the valve must be completely disassembled. The disadvantages of such types of valves are thus quite apparent.

It is the primary object of the present invention to obviate these and other prior art shortcomings. In particular, it is an object to provide new and novel apparatus which will achieve all of the functional advantages of prior art devices, but nevertheless to provide a device of relatively simple construction. More particularly, it is an object to provide new and novel valves wherein is employed a unitary and readily replaceable packing, which packing is of superior character and construction to those used by prior art valves. Yet further, it is an object to provide multiport valves of superior quality and construction readily adaptable for use in high temperature high pressure applications.

These and other objects are achieved in accordance with the present invention which contemplates a unitary tubular outer member with a plurality of side openings or ports through the walls thereof, and a concentric inner tubular member or cartridge with ports or openings similarly arranged as those of the outer tubular member. The ports or openings of the latter are in alignment with openings of the said outer tubular member when the valve is assembled for use. In each of the tubular members a plurality of ports or openings are arranged on opposite sides of the tubular members. It is the function of the ports on one side of the valve to provide communication for ingress and egress of fluid into and out of the valve in desired sequence. The ports or openings on either side of the valve generally lie in the same plane which may be the same or different from the plane within which lies the remaining series of ports or openings.

The inner tubular member serves as an "extension" of the outer member, and also carries a unitary packing. The member as such, inter alia, serves as a readily replaceable cartridge whereby a new packing can be readily inserted when desired.

Within the inner tubular member is contained a slidable or reciprocable plunger provided with a plurality of short internal axially aligned channels each of length sufficient to communicate one pair of the alternate series of ports with the other, and also capable of alternating communication between adjacent pairs of ports which are opposite one to the other.

Figure 2:
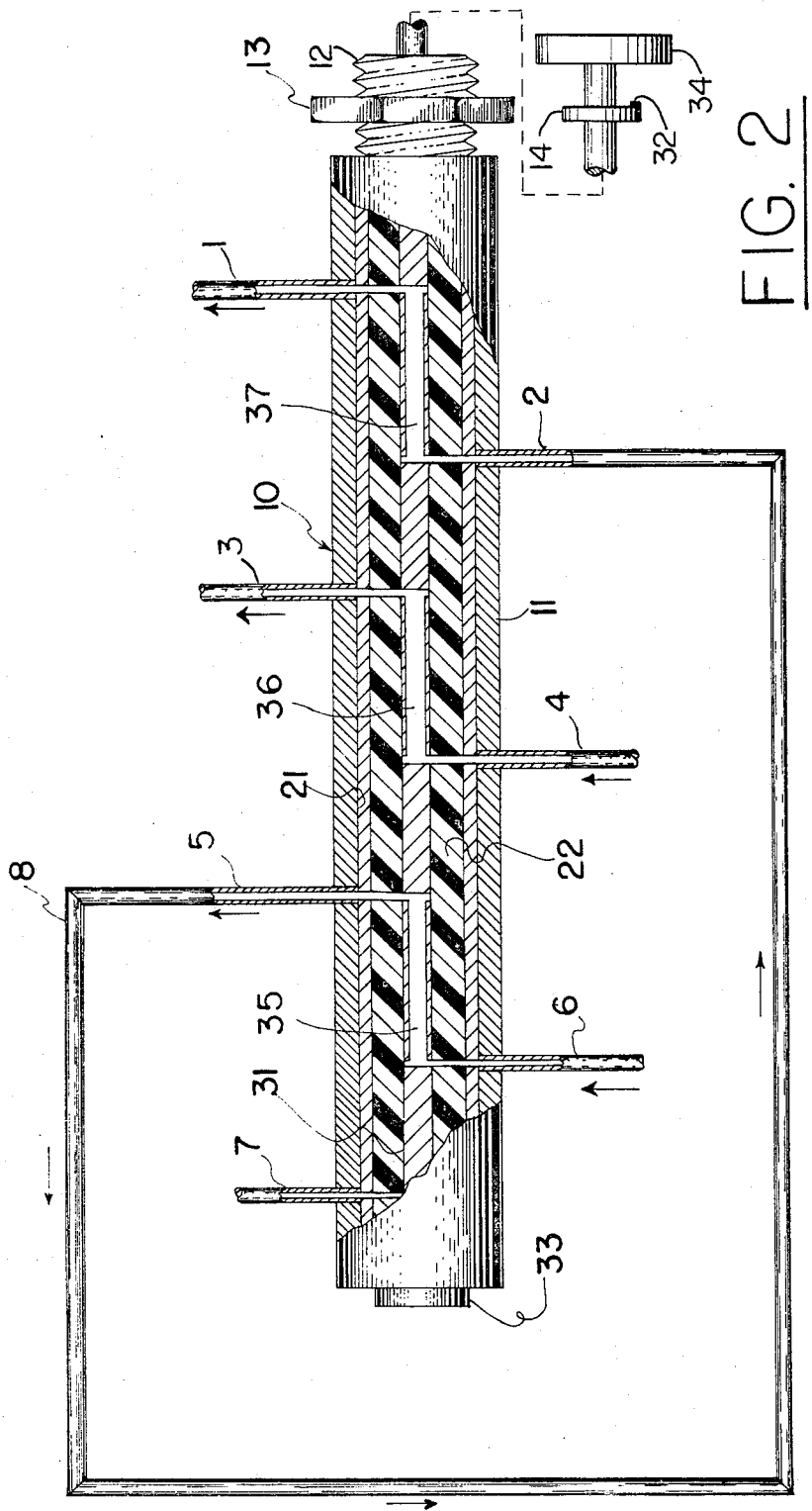

The invention will be better understood by reference to the attached figures and to the following detailed description which makes specific reference to the figures. The description is directed to a specific and preferred embodiment, the features and function of which will be clear in view of the following wherein:

FIGURE 1 is a partial section view of a multiport valve of this invention with the sample loop open to e.g. a gas chromatograph column (not shown), FIGURE 2 is similar to the view shown in FIGURE 1 except the reciprocable plunger has been retracted, or withdrawn outwardly to the right, to close the sample loop to the column, and to open the sample loop to supply, FIGURE 3 is an enlarged partial section view of the device of FIGURES 1 and 2, without the plunger, showing a preferred seal arrangement at the location of entry of the side inlet members, FIGURE 4 is a fragmentary section view of a side inlet member, FIGURE 5 is a fragmentary view of the inner tubular member shown in partial section, this figure depicting the nature of the primary packing and the manner in which it is held in position within the tubular member, and FIGURE 6 is the plunger shown in section.

Referring firstly to FIGURES 1 and 2 is shown a multi-port valve 10 which includes generally an outer tubular body or member 11, an inner cartridge or tubular member 21, and fitting therein a reciprocable partially hollow plunger 31.

The outer tubular member 11 is threaded at one end, carries a nut 13, and is for engagement and mounting upon a panel (not shown). Seven ports or openings, four on the bottom side and three on the bottom side of multi-port valve 10, are shown and within each is fitted a relatively small rigid conduit. In this embodiment the so-formed side openings, and side inlets or conduits, all lie in the same plane and are designated by numbers 1 through 7. Conduit 3 leads to the column of a gas chromatograph (not shown), conduit 4 is a gas inlet for the carrier gas, e.g. helium, to the column, and conduit 6 is a fluid sample inlet. Conduits 1, 7 are vents which open to the atmosphere, and conduits 2, 5 are connected together via a closed conduit 8 which forms a sample loop.

The inner tubular member 21 or cartridge consists of an outer thin metal shell or wall within which is tightly fitted an open centered concentric or tubular packing 22 which extends the entire length of said member 21. It will be observed that the said shell and packing 22 of inner tubular member 21 is also provided with side openings or ports corresponding in number, arrangement and location to those openings within outer member 11.

Located and slidably fitted within inner member 21 is a plunger 31. The plunger 31 is provided with a plurality of short channels or axially aligned openings 35, 36, 37 the terminal ends of each of which are provided with lateral openings extending through the upper and lower walls of the plunger. The length of each channel 35, 36, 37 is equal to the distance between adjacent alternate pairs of lateral openings or conduits, e.g. the distance between conduits 1 and 2 or conduits 2 and 3, which are located on either side of channel 37. By reference to FIGURE 1 which shows the plunger 31 in its maximum forward position, it will be observed that the function of channel 35 is to connect together conduits 6, 7, the function of channel 36 is to connect together conduits 4, 5, and the function of channel 37 is to connect together conduits 2, 3. Alternatively, as will be seen by reference to FIGURE 2 which shows the plunger 31 in its fully retracted position, the function of channel 35 is to connect together conduits 5, 6, the function of channel 36 is to connect together conduits 3, 4, and the function of channel 37 is to connect together conduits 1, 2.

A full cycle of operation to fill and discharge an accurately measured fluid specimen from multiport valve 10 requires two movements of plunger 31, i.e. a full inward movement and a full outward movement. Inward movement to the full extent is shown by reference to FIGURE 1, and outward movement of plunger 31 to the full extent is shown by reference to FIGURE 2. Inward movement (movement toward the left) is limited by a stop (not shown) so that plunger handle 34 stops short of the end wall 14 of outer member 11. Outward movement (movement to the right) is limited by stop 33 which can impinge against the terminal end of cylindrical packing 22.

To discharge fluid from sample loop 8 plunger 31 is projected inward as shown in FIGURE 1. A carrier gas, e.g. helium, passes into conduit 4, through channel 36, into conduit 5 and through sample loop 8. The fluid from sample loop 8 is pushed into conduit 2, through channel 37 and enters the gas chromatograph via conduit 3.

To refill sample loop 8 the handle 34 is pulled outward and plunger 31 is thus retracted to the position shown in FIGURE 2. In this position the carrier gas enters channel 36 and conduit 3 via conduit 4, and the flow of sample to the gas chromatograph is discontinued. Flow of sample to refill the sample loop 8, however, is initiated. Fluid thus flows through inlet 6, channel 35 and conduits 5 to fill the sample loop 8.

A feature of this invention resides in the construction of the several components of the multiport valve 10 by virtue of which the device can be employed for trapping and dispensing accurately measured quantities of sample fluid at high temperatures and pressures. The seal constructions herein disclosed minimize leakage, and when replacement of packings is desired, this can be done readily, rapidly and conveniently.

By reference to FIGURES 3 and 4 is shown a partial section view of outer and inner tubular members 11, 21 within the walls of which are fitted special forms of lateral conduits 1 through 7. These conduits, as mentioned with reference to FIGURES 1 and 2, hold the members 11, 21 in position one relative to the other and provide communication with the central or axial opening into which fits partially hollow reciprocal plunger 31. The conduits 1–7 are fitted snugly into place by projection through openings provided within the walls of members 11, 21. If desired, individual seals (not shown) can be used to align the openings through which the individual conduits 1–7 are projected. Preferably tubular shaped packings are inserted in the wall openings and the conduits 1–7 are projected through the central openings provided within the seals.

In a preferred embodiment the externally projecting terminal ends of conduits 1–7 are provided with externally threaded portions, the precise nature and purpose of which will be described by specific reference to FIGURE 4. This figure depicts a mode of construction equally applicable to any one of the several conduits 1–7.

In FIGURE 4 is thus shown, e.g. conduit 2, mounted at one terminal end upon wall 21. The opposite end of conduit 2 is provided with an externally affixed threaded member 41. Through conduit 2 is fitted a conduit 43 of smaller internal diameter, upon the outer wall of which is provided shank 44. The internally threaded cap 45 screws down upon threaded member 41 exerting force upon shank 44 to push the smaller conduit 43 through packing the desired distance. When desired, the external conduit 2 can also be mounted upon the wall of the outer tubular member 11.

By use of these internal tubular conduits precise alignment and proper communication are thus readily provided. The inner tubular conduits can thus be projected through the outer tubular conduits 1–7 precisely to the location wherein the terminal ends flush with or fall just short of the interior surfaces of packing 22. By tightening of the knurled knobs the conduits are held in place.

Reference to FIGURE 5 shows the highly preferred features of construction of inner tubular member 21. The inner walls of the shell of member 21 are lined by a tubular shaped seal 22 which is held tightly and securely in place by crimping of the shell wall. Preferably, the wall is crimped in a manner providing a plurality of continuous tangential or circumferential grooves or indentations 51, 52, 53, 54 which hold the seal 22 tightly and securely in place, and provides a snug leakproof bore for movement therein of plunger 31. Preferably, the circumferential grooves 51–54 are spaced apart at such distance that they each lie between a conduit of the asembled multiport valve 10.

The reciprocable plunger is shown in greater detail by reference to FIGURE 6. The plunger 31 is comprised of a hollow portion within which is tightly fitted a plurality of plugs or cylindrical packings 58, 59. Every other packing member 55, 56, 57 has a channel cut through the axis thereof, and at the terminal ends of each so-formed tubular packing is provided a lateral hole cut all the way through the packing. It is these tubular sections of packings which provide the respective channels of communication between the upper latter conduits and lower conduits when the plunger 31 is moved from one operating position to another.

The packings used in the multiport valve are made of the "self-lubricating" types of materials. Preferably the packings are formed from polymers of fluoroethylene, most preferably polytetrafluorethylene (Teflon).

The partially hollow plunger per se, with its snugly fitted Teflon plugs or packings is outstanding in its function of providing interior conduits for flow of gases or liquids. There is virtually no leakage around the packings even of vapors subjected to high temperatures and pressures.

The plunger is readily movable within the large unitary packing of the inner tubular member within which it is snugly slidably fitted. The crimps serve as gaskets between the individual ports, preventing leakage therebetween even at relatively high temperatures and pressures.

The packings fitted into the wall in such manner provides a readily removable "cartridge" which is conveniently replaced. Thus, to remove the cartridge all that is necessary is to withdraw the lateral conduits from the ports or openings and then withdraw the cartridge. A fresh cartridge is readily inserted and secured within the multiport valve by projection of the lateral conduits into the ports or openings of the new member, the extensions thereof into the openings being readily gauged by tightening of the knurled knobs which project the conduits inwardly the desired distance.

Having described the invention what is claimed is:

1. In combination, a valve comprising
    an outer tubular member the enclosing wall of which is provided with a plurality of lateral ports, a first group of ports extending through one side of the wall and a second group of ports extending through an opposite side of the wall, the ports on opposite sides of the wall being alternately arranged one with respect to another,
    an inner tubular member including an outer shell wall and a tubular packing lining the length of the inner wall, said shell wall and packing being provided with a plurality of ports corresponding in number and location to those in the outer tubular member, and capable of alignment therewith,
    lateral conduits aligned upon each of the several ports,
    a reciprocable partially hollow plunger provided with a plurality of spaced apart axially aligned channels lying at the axis of the plunger, each of said channels being of substantially the same length as the distance between adjacent pairs of ports, and both ends of each of the channels having lateral openings for alternate alignment with adjacent pairs of ports located on opposite sides of the tubular members.

2. The apparatus of claim 1 further defined in that the inner tubular member contains a unitary tubular packing held in place by a series of circumferential crimps contained in the outer walls of said inner tubular member.

3. The apparatus of claim 2 wherein the packing is Teflon.

4. The apparatus of claim 1 wherein the channels within the hollow portion of the reciprocable plunger are constituted of a plurality of packings, each alternate packing of which is of tubular shape with lateral openings at both ends, and between each of which is located a cylindrical plug.

5. The apparatus of claim 4 wherein the tubular packings are constituted of Teflon.

6. The apparatus of claim 1 wherein a lateral conduit aligned upon a port is provided at its terminal end with an externally threaded member, and through which member and conduit is passed a second conduit of smaller internal diameter, said smaller conduit being provided with a shank whereby a force applied thereupon by a capping member threadably engaged to the terminal end of the externally threaded member adjusts the said second conduit of small internal diameter.

7. The apparatus of claim 6 wherein the conduit of smaller internal diameter is projected into an opening within the packing of the internal tubular member, which opening is of smaller diameter than said conduit and provides a pressure seal.

References Cited

UNITED STATES PATENTS

| | | | |
|---|---|---|---|
| 2,846,121 | 8/1958 | Ronnebeck | 73—422 |
| 3,044,491 | 6/1962 | Sangster | 137—625.18 |
| 3,318,154 | 5/1967 | Rendina | 73—422 |

LOUIS R. PRINCE, *Primary Examiner.*

S. C. SWISHER, *Assistant Examiner.*